(12) United States Patent
Tanizaki et al.

(10) Patent No.: US 7,125,630 B2
(45) Date of Patent: Oct. 24, 2006

(54) NON-AQUEOUS ELECTROLYTE BATTERY

(75) Inventors: Hiroaki Tanizaki, Miyagi (JP); Atsuo Omaru, Fukushima (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 10/430,778

(22) Filed: May 6, 2003

(65) Prior Publication Data

US 2004/0029012 A1  Feb. 12, 2004

(30) Foreign Application Priority Data

May 8, 2002 (JP) ............................ P2002-133085

(51) Int. Cl.
*H01M 4/48* (2006.01)
(52) U.S. Cl. ................ 429/231.1; 429/220; 429/231.3; 429/221; 429/231.95; 429/231.5; 429/231.6; 429/231.4; 429/231.8
(58) Field of Classification Search ............. 429/231.1, 429/220, 231.3, 221, 231.95, 231.5, 231.6, 429/231.4, 231.8
See application file for complete search history.

(56) References Cited

FOREIGN PATENT DOCUMENTS

EP  1 102 340  *  5/2001

* cited by examiner

*Primary Examiner*—Laura Weiner
(74) *Attorney, Agent, or Firm*—Sonnenschein Nath & Rosenthal LLP

(57) ABSTRACT

A non-aqueous electrolyte battery includes an cathode having an cathode mixture layer containing an cathode active material; an anode having an anode mixture layer containing an anode active material which includes a first active material and/or a second active material, where the first active material includes a metal, alloy or compound capable of react with lithium, and the second active material includes a carbonaceous material; and a non-aqueous electrolytic solution. By allowing the anode to contain the first active material in a predetermined amount, and by controlling the packing ratio of the anode mixture layer, the anode is successfully prevented from being degraded due to expansion-and-shrinkage of the anode active material in response to the charge/discharge cycle, and thus degradation of the charge/discharge characteristics of the battery is suppressed.

9 Claims, 1 Drawing Sheet

NON-AQUEOUS ELECTROLYTE BATTERY

CROSS REFERENCES TO RELATED APPLICATIONS

The present invention claims priority to its priority document No. 2002-133085 filed in the Japanese Patent Office on May 8, 2002, the entire contents of which being incorporated by reference herein.

BACKGROUND OF THE INVENTION

1. Field of the Invention

The present invention relates to a non-aqueous electrolyte battery which includes an cathode, an anode and a non-aqueous electrolyte, and has battery characteristics improved to a considerable degree.

2. Description of the Related Art

Recent development activities on secondary batteries are directed to reduce weight and increase energy density for applications such as a power source for electronic appliances, e.g. a notebook-sized personal computer, mobile phone and camera-integrated VTR (video tape recorder). One known secondary battery having a large energy density is lithium secondary battery which typically has an energy density larger than those of lead battery, nickel-cadmium battery or the like, and uses lithium metal as a material for the anode. The lithium secondary battery, however, undesirably tends to deposit lithium on the anode during charging, and thus-deposited inactive lithium in a form of dendrite makes it difficult to achieve excellent charge/discharge cycle characteristics.

Lithium ion secondary battery, which uses carbonaceous material as the anode, is known as one solution for this problem. The lithium ion secondary battery is based on a cell reaction by which lithium ion is intercalated between layers of a carbonaceous material, such as graphite, constituting the anode. Thus the lithium ion secondary battery uses a carbonaceous material, capable of insertion/extraction lithium, for the anode active material thereof. This constitution of the lithium ion secondary battery successfully prevents lithium from depositing on the anode during charging, and provides excellent charge/discharge cycle characteristics. The lithium ion secondary battery is also advantageous in improving yield ratio in the manufacture thereof because the carbonaceous material used for the anode is stable in the air.

SUMMARY OF THE INVENTION

Efforts for raising the capacity of the anode of lithium ion secondary battery would, however, be limited since the intercalation of lithium into the carbonaceous material is allowable only to a degree that a composition expressed by $C_6Li$ is attained for the first-stage graphite interlayer compound. Another problem of the lithium ion secondary battery resides in difficulty in controlling fine lamellar structure or micro-pore structure of the carbonaceous material, which serves as an anode active material, during synthesis thereof. In the lithium ion secondary battery, it is still also difficult to increase energy density because the carbonaceous material which serves as an anode active material has only a relatively small specific gravity and thus can provide only a small anode capacity per unit volume of the anode.

As an example of the aforementioned carbonaceous materials, a low-temperature-sintered carbonaceous material is known to have an anode capacity exceeding 1,000 mAh/g. When the low-temperature-sintered carbonaceous material having such a large capacity is used as an anode active material of the lithium ion secondary battery, the anode will have a large capacity as noble as 0.8 V or more relative to lithium metal, and this may undesirably lower the discharge voltage for the case where a metal oxide or the like is used as an cathode active material.

The lithium ion secondary battery using a carbonaceous material for the anode is therefore difficult to follow up a higher capacity and higher energy density which are increasingly demanded with the evolution of electronic appliances, and there is a strong need for an anode active material having an improved lithium insertion/extraction capability.

One possible solution for this problem relates to a lithium ion secondary battery, in which a special kind of lithium alloy is used as an anode active material in place of a carbonaceous material, and the charge/discharge is based on reversible electrochemical insertion/extraction of the lithium alloy.

As for use of the lithium alloy as the anode active material, use of a Li—Al alloy, Li—Si alloy and so forth has already been known. U.S. Pat. No. 4,950,566 describes use of a Li—Si alloy as the anode active material.

The lithium ion secondary battery using a lithium alloy for the anode, however, suffers from a problem that the lithium alloy considerably expands or shrinks in the charge/discharge cycle, and the repetitive charge/discharge cycle causes repetitive expansion/shrinkage of the lithium alloy, which may result in breakdown of the lithium alloy and degraded battery characteristics.

More specifically, in the lithium ion secondary battery having the anode made of a lithium alloy, grains of the anode active material causes cracks due to expansion/shrinkage of the lithium alloy during the charge/discharge cycle. While the cracks can open and close in response to the expansion-and-shrinkage during the charge/discharge cycle, such open/close action in response to the charge/discharge cycle may gradually become difficult if the lithium alloy reacts typically with the electrolyte to produce byproducts such as lithium oxide, and thus-produced oxide deposits on the inner surface of the cracks. In such lithium ion secondary battery, this produces new cracks in the grains of the anode active material with the progress of the charge/discharge cycle, and the new cracks will further have the byproducts deposited one after another on the inner surface thereof. That is, repetition of the charge/discharge cycle successively produces cracks in the grains of the anode active material to thereby pulverize them, and such degradation of the anode degrades the battery characteristics as a consequence.

There are also proposed lithium alloys or compounds having suppressed expansion-and-shrinkage during the charge/discharge cycle, which are exemplified by $Li_xSiO_y$, ($x \geq 0$, $2>y>0$) disclosed in Japanese Laid-Open Patent Publication No. 6-325765, $Li_xSi_{1-y}M_yO_z$ ($x \geq 0$, $1>y>0$, $0<z<2$) disclosed in Japanese Laid-Open Patent Publication No. 7-230800, and the Group 4B compound excluding carbon disclosed in Japanese Laid-Open Patent Publication No. 11-102705.

It is, however, still difficult for these proposals to satisfactorily suppress the degradation of the lithium alloys or compounds, that is, the degradation of the anode, during the repetitive charge/discharge cycle, and the anode active materials still cannot fully exhibit their potential for higher capacity at present.

The present invention is conceived in view of the aforementioned situation. It is desirable to provide a non-aqueous electrolyte battery having a larger energy density and better charge/discharge cycle characteristics.

A non-aqueous electrolyte battery according to one aspect of the present invention have a large energy density and excellent charge/discharge cycle characteristics by making the anode contain a predetermined amount of anode active material which allows lithium to insert/extract thereto or therefrom, and includes any of metal, alloy and compound capable of react with lithium, and by controlling packing ratio of an anode mixture layer.

That is, the non-aqueous electrolyte battery according to the present aspect includes an cathode containing an cathode active material allowing lithium to insert/extract thereto and therefrom; an anode including an anode mixture layer having an anode active material which contains a first active material and/or a second active material, the first active material being capable of allowing lithium to insert/extract thereto and therefrom, and including a metal, an alloy or a compound reactive with lithium, and the second active material including a carbonaceous material allowing lithium to insert/extract thereto and therefrom; and a non-aqueous electrolyte containing an electrolytic salt. The anode contains the first active material at least in an amount of 10 wt % of the total anode active material, and a packing ratio $y/((ax+bz)/(a+b))$ of the anode mixture layer falls within a range from 0.5 to 0.8, both ends inclusive, where "a" represents weight of the first active material, "x" represents true specific gravity of the first active material, "b" represents weight of the second active material, "z" represents true specific gravity of the second active material, and "y" represents density of the anode mixture layer.

In this non-aqueous electrolyte battery, by controlling of the packing ratio of the anode containing at least the first active material, it is possible to prevent the anode from being excessively applied with stress due to interference between grains of the anode active material, which may expand and shrink with the charge/discharge cycle, when such anode active material expands. Furthermore, it is possible to prevent the anode from being degraded in the conductivity due to disconnection of the grains of the anode active material when such anode active material shrinks.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which.

DETAILED DESCRIPTION OF THE PREFERRED EMBODIMENTS

Figure 1:
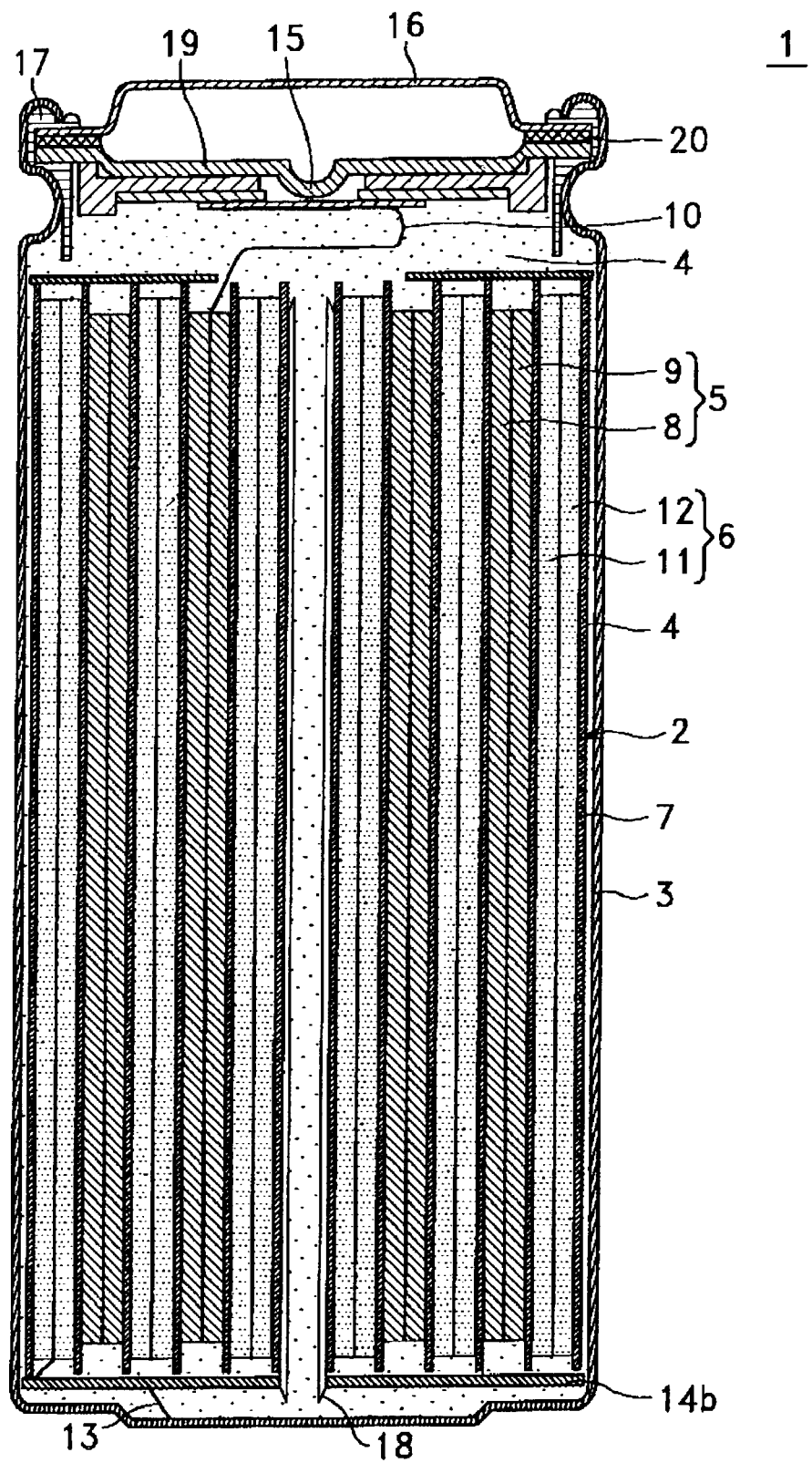
FIG. 1 is a schematic sectional view showing an internal structure of a lithium ion secondary battery according to the present invention.

Embodiments of a non-aqueous electrolyte battery applied with the present invention will be described below. An exemplary constitution of a lithium ion secondary battery (simply referred to as "battery", hereinafter), as a representative of the non-aqueous electrolyte battery, is shown in FIG. 1. The cell 1 is configured in such a way that a battery element 2 which serves as a generating element is sealed in an outer can 3 together with a non-aqueous electrolytic solution 4.

The battery element 2 is composed so that a strip-formed cathode 5 and a strip-formed anode 6 are wound up in a close contact while placing a separator 7 in between.

The cathode 5 is composed so that an cathode mixture layer 9, which contains an cathode active material, is formed on an cathode current collector 8. The cathode 5 has also an cathode terminal 10 which is connected at a predetermined position of the cathode current collector 8 so as to be projected out from one end thereof in the width-wise direction. A metal strip typically composed of aluminum is used as the cathode terminal 10.

The cathode active material contained in the cathode 5 is typically composed of lithium-free metal sulfide or metal oxide such as $TiS_2$, $MoS_2$, $NbSe_2$ and $V_2O_5$, or of lithium composite oxide typically expressed by $Li_xMO_2$ (where x falls within a range from 0.5 to 1.1, and M represents any one or a plurality of transition metals). Examples of the lithium composite oxide include $LiCoO_2$, $LiNiO_2$, $Li_yNi_yCO_{1-y}O_2$ (where x and y satisfy $0<x<1$ and $0.7<y<1.02$, respectively, although variable depending on charge/discharge conditions of the battery), and spinel-type, lithium-manganese composite oxide typically expressed by $LiMn_2O_4$. For the cathode active material of the cathode 5, it is also allowable to use any one of, or any mixtures of the aforementioned metal sulfide, metal oxide and lithium composite oxide. The cathode current collector 8 of the cathode 5 is typically composed of a mesh-formed or a foil-formed aluminum.

A binder contained in the cathode mixture layer 9 of the cathode 5 may be any known resin material generally used for this kind of non-aqueous electrolyte battery. The binder is specifically exemplified by poly(vinylidene fluoride). A conductive material contained in the cathode mixture layer 9 of the cathode 5 may be any known material generally used for this kind of non-aqueous electrolyte battery. Specific examples of the conductive material include carbon black and graphite.

The anode 6 is composed so that an anode mixture layer 12, which contains the first active material and/or second active material as the anode active material, is formed on an anode current collector 11. The anode 6 has also an anode terminal 13 which is connected at a predetermined position of the anode current collector 11 so as to be projected out from one end thereof in the width-wise direction. A metal strip typically composed of copper or nickel is used as the anode terminal 13.

The first active material contained in the anode 6 is typically composed of a metal capable of forming an alloy with lithium, or of a compound of such metal. The first active material is typically a compound expressed by $M_xM'_yLi_z$, where M represents a metal capable of forming a lithium alloy, M' represents a metal element other than M, x is a value larger than 0, and y and z are values equals to or larger than 0. Also compounds containing a semiconductor element such as B, Si or As can be exemplified as the first active material of the anode, and specific examples of the first active material of the anode include elements of Mg, B, Al, Ga, In, Si, Ge, Sn, Pb, Sb, Bi, Cd, Ag, Zn, Hf, Zr and Y; and compounds including any of these elements such as Li—Al, Li—Al-M (where M represents any one of, or any combination of the Group 2A, 3B or 4B transition metal elements), Al—Sb and Cu—Mg—Sb.

The lithium-alloy-formable element used as the first active material is exemplified by the Group 3B typical elements, where preferable examples of which are Si and Sn, and a more preferable example is Si. More specifically, compounds expressed by $M_xSi$ or $M_xSn$ (where M represents an element other than Si and Sn, and x is a value equal to or larger than 0) include $SiB_4$, $SiB_6$, $Mg_2Si$, $Mg_2Sn$, $Ni_2Si$, $TiSi_2$, $MoSi_2$, $NiSi_2$, $CaSi_2$, $CrSi_2$, $Cu_5Si$, $FeSi_2$, MnSi$_2$, NbSi$_2$, TaSi$_2$, VSi$_2$, WSi$_2$ and ZnSi$_2$, where all of which can be used independently or in combination.

Also any compound of the Group 4B element other than carbon and containing one or more non-metallic element can be used as the first active material. The compound may contain two or more species of the Group 4B elements. Specific examples thereof include SiC, Si$_3$N$_4$, Si$_2$N$_2$O, SiO$_x$ (0<x≦2), SnO$_x$ (0<x≦2), LiSiO and LiSnO, where all of which can be used independently or in combination.

The first active material can be synthesized by annealing any source material for the aforementioned compounds under an inert gas atmosphere or under a reductive gas atmosphere at a predetermined temperature for a predetermined time period, where the synthetic method is by no means limited thereto, and a variety of any other methods are allowable. Insertion of lithium into the first active material is typically accomplished by supplying lithium from the cathode 5 or a lithium source other than the cathode 5 before or after fabrication of the battery, or by introducing lithium during synthesis of the anode active material.

Beside the aforementioned compounds, also carbonaceous materials capable of allowing lithium ion to insert/extract can be used as the second active material contained in the anode 6. Specific examples of the carbonaceous material include graphites such as artificial graphite or naturally-occurred graphite, non-graphitizable carbon, thermally decomposed carbons, cokes, vitreous carbon fiber, organic polymer sintered material, carbon fiber, activated carbon and carbon blacks, where all of which can be used independently or in combination.

In the anode 6, the anode mixture layer is formed using an anode active material containing the first active material which is typically comprised of the aforementioned metal or alloy and has a relatively large true specific gravity and/or the second active material which is typically comprised of the carbonaceous material and has a relatively small true specific gravity. Because the specific gravities of the first and second active materials thus differ from each other, the packing status of the anode active material in the anode mixture layer will affect the battery characteristics.

More specifically, if the anode active material is packed too densely in the anode mixture layer, grains of the anode active material which expand during expansion/shrinkage thereof in response to the charge/discharge cycle of the battery 1 may cause cracks due to stress generated by interference of the grains, and may degrade the battery characteristics. On the contrary, if the anode active material is packed less densely in the anode mixture layer, grains of the anode active material which shrink during expansion/shrinkage thereof in response to the charge/discharge cycle of the battery 1 may widen the gaps between the grains so as to interfere mutual contact thereof, and may lower the conductivity of the anode mixture layer 12 to thereby degrade the battery characteristics. In particular, the first active material exhibits large expansion-and-shrinkage in response to the charge/discharge cycle of the battery 1, and tends to enhance the above-described nonconformities.

As for the anode 6, it is therefore necessary to suppress degradation of the battery characteristics, which is possibly caused by expansion-and-shrinkage of the anode active material in response to the charge/discharge cycle of the battery 1, by controlling the packing status of the anode mixture layer 12. More specifically, the packing status of the anode mixture layer can be optimized and excellent battery characteristics can be obtained by controlling a ratio of the density of the actually-formed anode mixture layer 12 relative to the density which is theoretically attainable by packing the first active material and/or second active material tightly without gaps in the anode mixture layer 12 within a predetermined range.

The packing ratio, that is, a ratio of the theoretical density attainable when the anode active material grains are tightly packed without gaps in the anode mixture layer 12 and the density of the actually-formed anode mixture layer can be expressed by M, where $M=y/((ax+bz)/(a+b))$. In the equation, "a" represents weight of the first active material, "x" represents true specific gravity of the first active material, "b" represents weight of the second active material, "z" represents true specific gravity of the second active material, and "y" represents density of the anode mixture layer 12. It is to be noted that the true specific gravities involved in the above equation are values obtained by measurement using butanol as a measurement liquid.

The packing ratio of the anode mixture layer 12 of the anode 6 can be controlled by properly adjusting the compression status of the anode mixture layer 12 formed on the anode current collector 11 in the process of compressing the anode mixture layer 12. More specifically, the packing ratio of the anode mixture layer 12 of the anode 6 is controlled so as to satisfy the relation of $0.5 \leq y/((ax+bz)/(a+b)) \leq 0.8$.

In this anode 6, the packing ratio smaller than 0.5 indicates that the anode active material is less-densely packed in the anode mixture layer 12, and has a wider gap between the individual grains. In such battery 1, the grains of the anode active material which shrink during expansion/shrinkage thereof in response to the charge/discharge cycle may break the contact between every adjacent shrunk grains, to thereby degrade the conductivity of the anode mixture layer 12. In particular in this case, the repetitive charge/discharge cycle will gradually widen the gaps between the grains, and degrade the charge/discharge cycle characteristics.

On the other hand, the packing ratio larger than 0.8 indicates that the anode active material is densely packed in the anode mixture layer 12, and has a narrower gap between the individual grains. In such battery 1, the grains of the anode active material which expand during expansion/shrinkage thereof in response to the charge/discharge cycle may exert excessive stress on themselves due to mutual interference of the grains, to thereby cause breakdown of the anode active material or separation of the anode mixture layer 12 from the anode current collector 11. In particular in this case, the repetitive charge/discharge cycle will gradually increase the grains of the anode active material which possibly interfere with each other, and will degrade the charge/discharge cycle characteristics.

Considering the above, control of the packing ratio in the anode 6 within a range from 0.5 to 0.8 is successful in suppressing nonconformities caused by expansion-and-shrinkage of the anode active material in response to the repetitive charge/discharge cycle of the battery 1, and in preventing the anode mixture layer 12 from being degraded in the conductivity or in the structure.

The second active material is considered as a beneficial active material for the anode 6 since it causes only a small expansion-and-shrinkage of the grains in response to the charge/discharge cycle of the battery 1, but is used only in a smaller mixing ratio relative to the first active material since it has a relatively small true specific gravity and thus makes it difficult to achieve a higher energy density.

The anode 6 is thus designed to contain the first active material in an amount of at least 10 wt % of the total anode active material. By making the anode 6 so as to contain the first active material having a relatively large true specific gravity in an amount of at least 10 wt % of the total anode active material, the battery 1 is made possible to efficiently enclose the anode active material within a predetermined limitative volume thereof, and to raise the energy density.

The separator 7 in the battery element 2 is used so as to separate the cathode 5 and anode 6, and can be composed of any known material generally used for an insulating porous film of this kind of non-aqueous electrolyte battery. More specifically, polymer films such as polypropylene film and polyethylene film can be used. The separator 7 is preferably thin as possible in view of relation between lithium ion conductivity and energy density, and the thickness is thus set to as thin as 30 µm or less.

The outer can 3 is typically a columnar container having a rectangular or flattened circular bottom plane, and is typically composed of iron, stainless steel or nickel for the case where it is connected to the anode 6. The outer can 3 composed of iron, for example, will have nickel plating on the surface thereof.

The non-aqueous electrolytic solution 4 may typically be a solution prepared by dissolving an electrolytic salt in a non-aqueous solvent. Examples of the non-aqueous solvent includes cyclic carbonate ester compounds; and cyclic carbonate ester compounds or chain-formed carbonate ester compounds of which hydrogen atom is substituted by a halogen atom or a halogenated acrylic group. More specifically, the non-aqueous solvent may be propylene carbonate, ethylene carbonate, diethyl carbonate, dimethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propionitrile, anisole, acetic acid ester, lactic acid ester and propionic acid ester, where all of which can be used independently or in combination. Particularly preferable non-aqueous solvents in view of voltage stability include propylene carbonate, vinylene carbonate, dimethyl carbonate, diethyl carbonate and dipropyl carbonate.

The electrolytic salts include $LiPF_6$, $LiClO_4$, $LiAsF_6$, $LiBF_4$, $LiB(C_6H_5)_4$, $LiCF_3SO_3$, $LiCH_3SO_3$, $LiN(CF_3SO_2)_2$, $LiSbF_6$, $LiClO_4$, LiCl and LiBr, where all of which can be used independently or in combination.

Thus-composed battery 1 can be fabricated as follows. First, the cathode 5 is fabricated. In the fabrication process of the cathode 5, an cathode mixture coating liquid containing an cathode active material, conductive material and binder is prepared first, and the cathode mixture coating liquid is then uniformly coated on both principal surfaces of the cathode current collector 8 including an aluminum foil or the like, dried, compressed to thereby form the cathode mixture layer 9, cut into a predetermined size, and the cathode terminal 10 is attached to a predetermined position of the cut piece typically by ultrasonic welding. This process yields a long-strip-formed cathode 5.

Next the anode 6 is fabricated. In the fabrication process of the anode 6, an anode mixture coating liquid containing an anode active material, in which the first and second active materials are mixed in a predetermined ratio so that the first active material is contained in 10 wt % or more of the total anode active material, and a binder is prepared first. The anode mixture coating liquid is then uniformly coated on both principal surfaces of the anode current collector 11 including a copper foil or the like, dried, compressed to thereby form the anode mixture layer 12, cut into a predetermined size, and the anode terminal 13 is attached to a predetermined position of the cut piece typically by ultrasonic welding. This process yields a long-strip-formed anode 6. As for the anode 6, a packing ratio of the anode mixture layer is controlled within a range from 0.5 to 0.8, both inclusive, by adjusting the compression status of the anode mixture layer.

Next, thus-obtained cathode 5 and anode 6 are layered while placing the long-strip-formed separator 7 in between, and the multiplayer structure is then wound up a plurality of turns to thereby fabricate the battery element 2. The battery element 2 herein is wound up in such a way that the cathode terminal 10 is projected out from one end in the width direction of the separator 8, and so as that the anode terminal 13 is projected out from the other end.

Next, insulating plates 14a, 14b are placed on both end planes of the battery element 2, and the battery element 2 is housed in the iron-made outer can 3 having the inner surface thereof nickel plated. A portion of the anode terminal 13 projected out from the battery element 2 is then welded typically on the bottom of the outer can 3. The outer can 3 is thus connected to the anode 6, and can serve as an external anode of the battery 1. On the other hand, a portion of the cathode terminal 10 projected out from the battery element 2 is welded to a current-blocking thin plate 15 to thereby establish electrical connection of the cathode 5 via the current-blocking thin plate 15 with a battery lid 16. The current-blocking thin plate 15 herein is provided to block current depending on the inner pressure within the battery. The battery lid 16 thus electrically connected with the cathode 6 can serve as an external cathode of the battery 1.

Then the non-aqueous electrolytic solution 4 is poured into the outer can 3. The non-aqueous electrolytic solution 4 is prepared by dissolving an electrolytic salt into a non-aqueous solvent. Next, the opening of the outer can 3 is caulked while being lined with an insulating gasket 17 coated with asphalt, to thereby fix the battery lid 16 and complete the battery 1.

The battery 1 has also a center pin 18 which serves as an axis around which the battery element 2 is wound up, a safety valve 19 through which inner gas is leaked when the internal pressure of the battery exceeds a predetermined level, and a PTC (positive temperature coefficient) element 20 for preventing temperature rise within the battery.

In thus-fabricated battery 1, the anode 6 is designed so as to contain the first active material, which includes a metal or compound of such metal, capable of forming lithium alloy, and has a relatively large true specific gravity, in an amount of at least 10 wt % of the total anode active material. This makes it possible to efficiently pack the anode active material in a predetermined limitative volume of the battery and thus to raise the energy density.

As another feature of the battery 1, the packing ratio of the anode mixture layer 12 of the anode 6, which includes the first active material and second active material, is adjusted so as to satisfy a relation $0.5 \leq y/((ax+bz)/(a+b)) \leq 0.8$, where "a" represents weight of the first active material, "x" represents butanol true specific gravity of the first active material, "b" represents weight of the second active material, "z" represents butanol true specific gravity of the second active material, and "y" represents density of the anode mixture layer 12.

The packing ratio of the anode mixture layer of the battery 1 is thus controlled within an appropriate range, and this makes it possible to successfully prevent the anode mixture layer 12 from being degraded in the conductivity due to disconnection of the grains of the shrunk anode active material during expansion-and-shrinkage thereof in response to the charge/discharge cycle, and also to prevent the anode mixture layer 12 from being mechanically degraded under excessive stress due to interference between expanded grains of the anode active material, and this makes it possible to prevent the battery characteristics from being degraded. In particular for the battery 1, degradation of the battery characteristics under repetitive charge/discharge, that is, so-called charge/discharge cycle characteristics, can successfully be suppressed.

While the aforementioned embodiment dealt with the battery 1 using the non-aqueous electrolytic solution 4, the present invention is by no means limited to the embodiment, and any batteries using a solid electrolyte such as inorganic, polymer and gel-formed ones, in place of the non-aqueous electrolytic solution 4 are allowable.

Examples of the inorganic solid electrolyte include lithium nitride and lithium iodide. The polymer solid electrolyte typically includes at least one of the above-described electrolytic salt and a polymer compound which can exhibit ion conductivity after being added with such electrolytic salt. Examples of the polymer compound available for the polymer solid electrolyte include ether-base polymers such as poly(ethylene oxide) and crosslinked products thereof; ester-base polymers such as poly(methacrylate); and acrylate-base polymer, where all of which can be used independently or in combination. The gel-formed electrolyte includes at least one of the above-described, non-aqueous electrolytic solution 4 and a matrix polymer capable of forming a gel by absorbing such non-aqueous electrolytic solution 4. Examples of the matrix polymer available for the gel-formed electrolyte include fluorine-containing polymers such as poly(vinylidene fluoride) and poly(vinylidene fluoride-co-hexafluoro propylene); ether-base polymers such as poly(ethylene oxide) and crosslinked products thereof; and poly(acrylonitrile); where all of which can be used independently or in combination. In particular for the matrix polymer, it is preferable to use a fluorine-containing polymer which generally has an excellent redox stability.

While the aforementioned embodiment dealt with a cylindrical battery, the present invention is by no means limited to the embodiment, and allows any batteries of which outer can is composed of a metal container having a variety of shapes such as of coin, square box, button and so forth and a variety of sizes.

Next paragraphs will describe samples of lithium ion secondary battery actually fabricated as the non-aqueous electrolyte battery applied with the present invention.

<Sample 1>

A lithium-cobalt composite oxide ($LiCoO_2$) was first synthesized as the cathode active material of Sample 1. In the synthesis of $LiCoO_2$, ithium carbonate and cobalt carbonate were mixed in a molar ratio of 0.5:1, and the mixture was sintered in the air atmosphere at 900° C. for 5 hours. Thus synthesized $LiCoO_2$ was then crushed and classified to thereby obtain $LiCoO_2$ powder.

Next, the anode was fabricated. In the fabrication of the anode, 91 g of the $LiCoO_2$ powder obtained in the above, 6 g of graphite as a conductive material, and 3 g of poly (vinylidene fluoride) (abbreviated as PVdF, hereinafter) as a binder were homogeneously dispersed in N-methyl-2-pyrolidone (abbreviated as NMP, hereinafter) to thereby obtain an cathode mixture coating liquid. Thus-obtained cathode mixture coating liquid was uniformly coated on an aluminum foil of 20 μm thick, which serves as an cathode current collector, dried, compressed using a roll press machine so as to form the cathode mixture layer, and then slit into a predetermined size to thereby fabricate the long-strip-formed cathode.

Next, an 80 wt % Cu-20 wt % Si alloy was synthesized as the first active material. In the synthesis of 0.80 wt % Cu-20 wt % Si alloy, 80 g of Cu and 20 g of Si are homogeneously mixed, the mixture was put in a quartz boat, fused in an argon atmosphere in an RF fusion furnace at 1,000° C., and the fused mixture was cooled to room temperature to thereby obtain the 80 wt % Cu-20 wt % Si alloy. Thus-obtained 80 wt % Cu-20 wt % Si alloy was then crushed using a ball mill in an argon atmosphere, and classified to thereby obtain a 80 wt % Cu-20 wt % Si alloy powder having an average grain size of 10 μm.

Next, the anode was fabricated. In the fabrication of the anode, 80 g of above-obtained 80 wt % Cu-20 wt % Si alloy, 10 g of scaly graphite as the second active material, and 10 g of PVdF as a binder are homogeneously dispersed in NMP to thereby prepare an anode mixture coating liquid. In this process, butanol true specific gravities of the first active material and second active material were measured using a picnometer. Butanol true specific gravities were found to be 6.3 g/cm$^3$ for the first active material and 2.2 g/cm$^3$ for the second active material.

Next, thus-prepared anode mixture coating liquid was uniformly coated on a copper foil of 10 μm thick which serves as an anode current collector, dried, compressed using a roll press machine so as to form the anode mixture layer, and then slit into a predetermined size to thereby fabricate the long-strip-formed anode which contains the first active material in an amount of 89 wt % of the total anode active material. The compression herein using the roll press machine was carried out so as to control the density of the anode mixture layer to 2.92 g/cm$^3$. The anode was therefore found to have a so-called packing ratio M [M=y/((ax+bz)/(a+b))] of 0.5, which is a ratio of the density of the actually-formed anode mixture layer relative to the density which is theoretically attainable by packing the first active material and/or second active material tightly without gaps in the anode mixture layer, where "a" represents weight of the first active material, "x" represents butanol true specific gravity of the first active material, "b" represents weight of the second active material, "z" represents butanol true specific gravity of the second active material, and "y" represents density of the anode mixture layer.

Next, in the process of fabricating the battery element, an aluminum-made cathode terminal and a nickel-made anode terminal were first welded to the individual current collectors of thus-obtained cathode and anode, respectively. The cathode and anode were layered while placing a separator which includes a porous polyethylene film of 25 μm thick in between, and such multiplayer structure was then wound up in a multiple turn to thereby fabricate the battery element. The battery element herein was fabricated so that the cathode terminal is led out from one edge thereof, and the anode terminal out from the other edge thereof.

Next, in the process of fabricating the lithium ion secondary battery, the cathode terminal led out from the battery element was welded to the battery lid, and the anode terminal to the nickel-plated outer can, and the hole battery element was housed in the outer can.

Next, the non-aqueous electrolytic solution was prepared by dissolving $LiPF_6$ in an 1:1 (v/v) mixed solvent of ethylene carbonate and dimethyl carbonate so as to adjust a concentration to 1.5 mol/L. The non-aqueous electrolyte was then poured into the outer can, and the opening of the outer can 3 is caulked while being lined with an insulating gasket 17 coated with asphalt to thereby tightly fix the battery lid 16.

By the process described in the above, the lithium ion secondary battery having a diameter of 18 mm and a height of 65 mm was fabricated. In the description below, the lithium ion secondary battery will be simply referred to as "battery" hereinafter as a matter of convenience.

<Sample 2>

In sample 2, the anode was fabricated by adjusting the density of the anode mixture layer to 4 g/cm$^3$, and the packing ratio M to 0.69. Except for using such anode, the battery was fabricated similarly to as described in Sample 1.

<Sample 3>

In sample 3, the anode was fabricated by adjusting the density of the anode mixture layer to 4.67 g/cm$^3$, and the packing ratio M to 0.8. Except for using such anode, the battery was fabricated similarly to as described in Sample 1.

<Sample 4>

In sample 4, the anode was fabricated by adjusting the content of the first active material to 10 wt % of the total anode active material, the density of the anode mixture layer to 1.31 g/cm$^3$, and the packing ratio M to 0.5. Except for using such anode, the battery was fabricated similarly to as described in Sample 1.

<Sample 5>

In sample 5, the anode was fabricated by adjusting the content of the first active material to 10 wt % of the total anode active material, the density of the anode mixture layer to 1.8 g/cm$^3$, and the packing ratio M to 0.69. Except for using such anode, the battery was fabricated similarly to as described in Sample 1.

<Sample 6>

In sample 6, the anode was fabricated by adjusting the content of the first active material to 10 wt % of the total anode active material, the density of the anode mixture layer to 2.08 g/cm$^3$, and the packing ratio M to 0.8. Except for using such anode, the battery was fabricated similarly to as described in Sample 1.

<Sample 7>

In sample 7, the anode containing no second active material was fabricated by adjusting the content of the first active material to 100 wt % of the total anode active material, the density of the anode mixture layer to 3.15 g/cm$^3$, and the packing ratio M to 0.5. Except for using such anode, the battery was fabricated similarly to as described in Sample 1.

<Sample 8>

In sample 8, the anode containing no second active material was fabricated by adjusting the content of the first active material to 100 wt % of the total anode active material, the density of the anode mixture layer to 4 g/cm$^3$, and the packing ratio M to 0.63. Except for using such anode, the battery was fabricated similarly to as described in Sample 1.

<Sample 9>

In sample 9, the anode containing no second active material was fabricated by adjusting the content of the first active material to 100 wt % of the total anode active material, the density of the anode mixture layer to 5.04 g/cm$^3$, and the packing ratio M to 0.8. Except for using such anode, the battery was fabricated similarly to as described in Sample 1.

<Sample 10>

In sample 10, the anode was fabricated by adjusting the density of the anode mixture layer to 2.8 g/cm$^3$, and the packing ratio M to 0.48. Except for using such anode, the battery was fabricated similarly to as described in Sample 1.

<Sample 11>

In sample 11, the anode was fabricated by adjusting the density of the anode mixture layer to 4.8 g/cm$^3$, and the packing ratio M to 0.82. Except for using such anode, the battery was fabricated similarly to as described in Sample 1.

<Sample 12>

In sample 12, the anode was fabricated by adjusting the content of the first active material to 10 wt % of the total anode active material, the density of the anode mixture layer to 1.2 g/cm$^3$, and the packing ratio M to 0.46. Except for using such anode, the battery was fabricated similarly to as described in Sample 1.

<Sample 13>

In sample 13, the anode was fabricated by adjusting the content of the first active material to 10 wt % of the total anode active material, the density of the anode mixture layer to 2.2 g/cm$^3$, and the packing ratio M to 0.84. Except for using such anode, the battery was fabricated similarly to as described in Sample 1.

<Sample 14>

In sample 14, the anode containing no second active material was fabricated by adjusting the content of the first active material to 100 wt % of the total anode active material, the density of the anode mixture layer to 3 g/cm$^3$, and the packing ratio M to 0.48. Except for using such anode, the battery was fabricated similarly to as described in Sample 1.

<Sample 15>

In sample 15, the anode containing no second active material was fabricated by adjusting the content of the first active material to 100 wt % of the total anode active material, the density of the anode mixture layer to 5.2 g/cm$^3$, and the packing ratio M to 0.83. Except for using such anode, the battery was fabricated similarly to as described in Sample 1.

<Sample 16>

In sample 16, the anode was fabricated by adjusting the content of the first active material to 9 wt % of the total anode active material, the density of the anode mixture layer to 1.8 g/cm$^3$, and the packing ratio M to 0.7. Except for using such anode, the battery was fabricated similarly to as described in Sample 1.

<Sample 17>

In sample 17, the anode containing no first active material was fabricated by adjusting the content of the second active material to 100 wt % of the total anode active material, the density of the anode mixture layer to 1.7 g/cm$^3$, and the packing ratio M to 0.77. Except for using such anode, the battery was fabricated similarly to as described in Sample 1.

Thus-fabricated batteries in Samples 1 to 17 were subjected to measurements of energy density and relative discharge capacity after the 100th cycle.

Tables 1 and 2 show evaluated results of the energy density and relative discharge capacity after the 100th cycle of Samples 1 to 17.

TABLE 1

| | 1st active material | | | 2nd active material | | | | | | Relative |
| | Material used | Butanol true specific gravity (g/cm³) | Weight (g) | Material used | Butanol true specific gravity (g/cm³) | Weight (g) | Content of 1st active material (wt %) | Density of anode mixture layer (g/cm³) | Packing ratio M | Energy density (Wh/L) | discharge capacity after the 100th cycle (%) |
|---|---|---|---|---|---|---|---|---|---|---|---|
| Sample 1 | 80 wt % Cu-20 wt % Si | 6.3 | 80 | Scaly graphite | 2.2 | 10 | 89 | 2.92 | 0.5 | 593 | 71 |
| Sample 2 | | | | | | | | 4 | 0.69 | 672 | 73 |
| Sample 3 | | | | | | | | 4.67 | 0.8 | 718 | 65 |
| Sample 4 | | | 9 | | | 81 | 10 | 1.31 | 0.5 | 401 | 68 |
| Sample 5 | | | | | | | | 1.8 | 0.69 | 420 | 85 |
| Sample 6 | | | | | | | | 2.08 | 0.8 | 443 | 64 |
| Sample 7 | | | 90 | none | — | 0 | 100 | 3.15 | 0.5 | 711 | 64 |
| Sample 8 | | | | | | | | 4.4 | 0.7 | 811 | 68 |
| Sample 9 | | | | | | | | 5.04 | 0.8 | 860 | 62 |

TABLE 2

| | 1st active material | | | 2nd active material | | | | | | Relative |
| | Material used | Butanol true specific gravity (g/cm³) | Weight (g) | Material used | Butanol true specific gravity (g/cm³) | Weight (g) | Content of 1st active material (wt %) | Density of anode mixture layer (g/cm³) | Packing ratio M | Energy density (Wh/L) | discharge capacity after the 100th cycle (%) |
|---|---|---|---|---|---|---|---|---|---|---|---|
| Sample 10 | 80 wt % Cu-20 wt % Si | 6.3 | 80 | Scaly graphite | 2.2 | 10 | 89 | 2.8 | 0.48 | 573 | 48 |
| Sample 11 | | | | | | | | 4.8 | 0.82 | 949 | 22 |
| Sample 12 | | | 9 | | | 81 | 10 | 1.2 | 0.46 | 340 | 47 |
| Sample 13 | | | | | | | | 2.1 | 0.84 | 469 | 52 |
| Sample 14 | | | 90 | None | — | 0 | 100 | 3 | 0.48 | 701 | 39 |
| Sample 15 | | | | | | | | 5.2 | 0.83 | 864 | 48 |
| Sample 16 | | | 8 | Scaly graphite | 2.2 | 82 | 9 | 1.8 | 0.7 | 387 | 72 |
| Sample 17 | None | — | 0 | | | 90 | 0 | 1.7 | 0.77 | 382 | 62 |

Energy density of Samples 1 to 17 was evaluated as follows. The individual samples were charged under a constant current of 1 A and a constant voltage of 4.2 V at maximum at 20° C., and were then discharged under a constant current of 1 A down to 2.5 V at 20° C. The energy density is defined as discharged electric energy per unit volume, that is, the discharged electric energy observed under the above charge/discharge cycle divided by volume of the battery. The relative discharge capacity after the 100th cycle was evaluated as follows. First, the individual samples were subjected to initial charge/discharge under a constant current of 1 A and a constant voltage of 4.2 V at maximum at 20° C., and were then discharged under a constant current of 1 A down to 2.5 V at 20° C. The individual samples were further subjected to the charge/discharge cycle repeated 100 times under the same conditions with those for the initial charge/discharge. The relative discharge capacity is defined as a ratio of a discharge capacity observed after the 100th cycle of the above-described charge/discharge relative to the initial discharge capacity.

It is known from the results summarized in Tables 1 and 2 that Samples 1 to 9 having a packing ratio M on the anode side within a range from 0.5 to 0.8 show larger values of the relative discharge capacity after the 100th cycle as compared with those of Samples 10, 12 and 14 having a packing ratio on the anode side smaller than 0.5.

Because in Samples 10, 12 and 14, the packing ratio M on the anode side is smaller than 0.5, the amount of packing of the anode active material in the anode mixture layer is too small, and thus the grains of the anode active material packed to form the anode mixture layer have a larger gap between them, mutual contact of the grains is disconnected when the anode active material shrinks in the expansion-and-shrinkage in response to the charge/discharge cycle, and this degrades the conductivity of the anode mixture layer. Therefore in Samples 10, 12 and 14, the gap between the grains of the anode active material will gradually increase with the progress of the charge/discharge cycle, also reduction in the conductivity on the anode side will become larger with the progress of the cycles, and the relative discharge capacity after the 100th cycle will thus become smaller.

It is also known from the evaluation results listed in Tables 1 and 2 that Samples 1 to 9 having the packing ratio M on the anode side within a range from 0.5 to 0.8 showed larger values of the relative discharge capacity after the 100th cycle as compared with those of Samples 11, 13 and 15 having a packing ratio M larger than 0.8.

Because in Samples 11, 13 and 15, the packing ratio M on the anode side is larger than 0.8, the amount of packing of the anode active material in the anode mixture layer is too large, and thus the grains of the anode active material packed to form the anode mixture layer have a narrower gap between them, the grains will excessively applied with stress when the anode active material expands in the expansion-and-shrinkage in response to the charge/discharge cycle, and this promotes breakdown of the anode active material or separation of the anode mixture layer from the anode current collector. Therefore in Samples 11, 13 and 15, breakdown of the anode active material and separation of the anode mixture layer, that are degradation of the anode, will proceed with the progress of the charge/discharge cycle, and the relative discharge capacity after the 100th cycle will become smaller.

On the contrary, Samples 1 to 9 having the packing ratio M on the anode side adjusted within an appropriate range from 0.5 to 0.8 are successful in preventing the anode from being lowered in the conductivity which otherwise possibly occurs when the amount of packing of the anode active material in the anode mixture layer is too small, or from being mechanically degraded which otherwise possibly occurs when the amount of packing of the anode active material in the anode mixture layer is too large. This suppresses degradation of the battery characteristics, and ensures excellent charge/discharge cycle characteristics.

It can still further be found from the results listed in Tables 1 and 2 that Samples 1 to 9 having the content of the first active material adjusted to 10 wt % or more of the total anode active material show larger energy density as compared with that of Samples 16 and 17 having the content of the first active material smaller than 10 wt %.

Because in Samples 16 and 17, the content of the first active material relative to the total anode active material is less than 10 wt % and the content of the second active material is consequently too large, packing of the anode active material containing an excessive amount of the second active material having a true specific gravity smaller than that of the first active material within a predetermined limitative volume of the battery will undesirably reduce the absolute amount of the anode active material, and will thus lower the battery capacity and reduce the energy density.

On the contrary in Samples 1 to 9, the content of the first active material relative to the total anode active material is appropriately adjusted to 10 wt % or more, so that use of the anode active material containing an appropriate amount of first active material having a true specific gravity larger than that of the second active material within a predetermined limitative volume of the battery will ensure an efficient packing of the anode active material, will suppress degradation of the battery capacity and will raise the energy density.

As judged from the above, it is known that control of the packing ratio M on the anode side within a range from 0.5 to 0.8, and control of the content of the first active material to 10 wt % or more of the total anode active material make it possible to successfully suppress degradation of the charge/discharge cycle characteristics and to achieve an energy density as large as 400 Wh/L or more. It is therefore clear that such control is fairly beneficial in fabricating a battery which is excellent in all of these battery characteristics.

Next, as other samples of the non-aqueous electrolyte battery applied with the present invention, Samples 18 to 25 were fabricated using 60 wt % Cu-40 wt % Sn as the first active material in place of that used in Samples 1 to 17.

<Sample 18>

In sample 18, the anode was fabricated by using 60 wt % Cu-40 wt % Sn as the first active material, adjusting the content of the first active material to 33.3 wt % of the total anode active material, the density of the anode mixture layer to 1.99 $g/cm^3$, and the packing ratio M to 0.5. Except for using such anode, the battery was fabricated similarly to as described in Sample 1.

<Sample 19>

In sample 19, the anode was fabricated by adjusting the density of the anode mixture layer to 2.5 $g/cm^3$, and the packing ratio M to 0.63. Except for using such anode, the battery was fabricated similarly to as described in Sample 18.

<Sample 20>

In sample 20, the anode was fabricated by adjusting the density of the anode mixture layer to 3.17 $g/cm^3$, and the packing ratio M to 0.5. Except for using such anode, the battery was fabricated similarly to as described in Sample 18.

<Sample 21>

In sample 21, the anode was fabricated by adjusting the content of the first active material to 10 wt % of the total anode active material, the density of the anode mixture layer to 1.37 $g/cm^3$, and the packing ratio M to 0.5. Except for using such anode, the battery was fabricated similarly to as described in Sample 18.

<Sample 22>

In sample 22, the anode was fabricated by adjusting the content of the first active material to 10 wt % of the total anode active material, the density of the anode mixture layer to 2.18 $g/cm^3$, and the packing ratio M to 0.8. Except for using such anode, the battery was fabricated similarly to as described in Sample 18.

<Sample 23>

In sample 23, the anode was fabricated by adjusting the density of the anode mixture layer to 1.9 $g/cm^3$, and the packing ratio M to 0.48. Except for using such anode, the battery was fabricated similarly to as described in Sample 18.

<Sample 24>

In sample 24, the anode was fabricated by adjusting the density of the anode mixture layer to 3.3 $g/cm^3$, and the packing ratio M to 0.83. Except for using such anode, the battery was fabricated similarly to as described in Sample 18.

<Sample 25>

In sample 25, the anode was fabricated by adjusting the content of the first active material to 9 wt % of the total anode active material, the density of the anode mixture layer to 1.3 $g/cm^3$, and the packing ratio M to 0.49. Except for using such anode, the battery was fabricated similarly to as described in Sample 18.

Thus-fabricated batteries in Samples 18 to 25 were subjected to measurements of energy density and relative discharge capacity after the 100th cycle.

Table 3 shows evaluated results of the energy density and relative discharge capacity after the 100th cycle of Samples 18 to 25.

TABLE 3

| | 1st active material | | | 2nd active material | | | Content of 1st active material (wt %) | Density of anode mixture layer (g/cm³) | Packing ratio M | Energy density (Wh/L) | Relative discharge capacity after the 100th cycle (%) |
| --- | --- | --- | --- | --- | --- | --- | --- | --- | --- | --- | --- |
| | Material used | Butanol true specific gravity (g/cm³) | Weight (g) | Material used | Butanol true specific gravity (g/cm³) | Weight (g) | | | | | |
| Sample 18 | 60 wt % Cu- | 7.5 | 30 | Scaly | 2.2 | 60 | 33.3 | 1.99 | 0.5 | 518 | 61 |
| Sample 19 | 40 wt % Sn | | | graphite | | | | 2.5 | 0.63 | 565 | 78 |
| Sample 20 | | | | | | | | 3.17 | 0.8 | 627 | 59 |
| Sample 21 | | | 9 | | | 81 | 10 | 1.37 | 0.5 | 411 | 64 |
| Sample 22 | | | | | | | | 2.18 | 0.8 | 497 | 55 |
| Sample 23 | | | 30 | | | 60 | 33.3 | 1.9 | 0.48 | 447 | 47 |
| Sample 24 | | | | | | | | 3.3 | 0.83 | 632 | 31 |
| Sample 25 | | | 8 | | | 82 | 9 | 1.3 | 0.49 | 371 | 35 |

The energy density and relative discharge capacity after the 100th cycle of Samples 18 to 25 were measured similarly to as described for Samples 1 to 17.

It is known from the results summarized in Table 3 that Samples 18 to 22 having a packing ratio M on the anode side within a range from 0.5 to 0.8 show larger values of the relative discharge capacity after the 100th cycle as compared with that of Sample 23 having a packing ratio M on the anode side of 0.48.

Because in Sample 23, similarly to Samples 10, 12 and 14, the packing ratio M on the anode side is as small as 0.48, the amount of packing of the anode active layer in the anode mixture layer is too small, and thus the grains of the anode active material packed to form the anode mixture layer have a larger gap between them, the gap between the grains of the anode active material will gradually increase with the progress of the charge/discharge cycle, also reduction in the conductivity on the anode side will become larger with the progress of the cycles, and the relative discharge capacity after the 100th cycle will thus become smaller.

It is also known from the evaluation results listed in Table 3 that Samples 18 to 22 having the packing ratio M on the anode side within a range from 0.5 to 0.8 showed larger values of the relative discharge capacity after the 100th cycle as compared with that of Sample 24 having a packing ratio M on the anode side of 0.83.

In Sample 24, similarly to the aforementioned Samples 11, 13 and 15, the packing ratio M on the anode side is as large as 0.83, the amount of packing of the anode active material in the anode mixture layer is too large, and thus the grains of the anode active material packed to form the anode mixture layer have a narrower gap between them. This promotes breakdown of the anode active material or separation of the anode mixture layer from the anode current collector, and the relative discharge capacity after the 100th cycle will become smaller.

On the other hand, Samples 18 to 22, similarly to the aforementioned Samples 1 to 9, are successful in preventing degradation of the anode, and in achieving excellent charge/discharge characteristics.

As judged from the above, it is known that control of the packing ratio M on the anode side within a range from 0.5 to 0.8 makes it possible to fabricate an excellent battery of which degradation in the charge/discharge characteristics is successfully suppressed even when the first active material is altered from the Cu—Si-base alloy to the Cu—Sn-base alloy.

It can still further be found from the results listed in Table 3 that Samples 18 to 22, which have the content of the first active material adjusted to 10 wt % or more of the total anode active material and have the packing ratio M on the anode side within a range from 0.5 to 0.8, show larger energy density and relative discharge capacity after the 100th cycle as compared with those of Sample 25 having a content of the first active material of 9 wt % and a packing ratio M on the anode side of 0.49.

In Sample 25, similarly to the aforementioned Samples 16 and 17, the content of the first active material is 9 wt % of the total anode active material, and the content of the second active material having a smaller true specific gravity is consequently too large, so that the battery capacity becomes smaller and the energy density is reduced. Because in Sample 25, similarly to the foregoing Sample 23, the packing ratio M on the anode side is as small as 0.49 and thus the grains of the anode active material packed to form the anode mixture layer have a larger gap between them, reduction in the conductivity on the anode side will become larger with the progress of the cycles, and the relative discharge capacity after the 100th cycle will thus become smaller.

On the contrary in Samples 18 to 22, similarly to the aforementioned Samples 1 to 9, the content of the first active material relative to the total anode active material is appropriately adjusted to 10 wt % or more, so that the battery capacity is successfully prevented from being lowered and the energy density is increased. In these Samples 18 to 22, again similarly to the aforementioned Samples 1 to 9, the packing ratio M on the anode side is appropriately adjusted within a range from 0.5 to 0.8, and this prevents degradation of the anode and ensures excellent charge/discharge characteristics.

As judged from the above, it is known that control of the content of the first active material to 10 wt % or more of the total anode active material, and control of packing ratio M on the anode side within a range from 0.5 to 0.8 make it possible to fabricate a battery which is excellent both in the charge/discharge characteristics and in energy density even when the first active material is altered from the Cu—Si-base alloy to the Cu—Sn-base alloy.

Next, as other samples of the non-aqueous electrolyte battery applied with the present invention, Samples 26 to 30 were fabricated using non-graphitizable carbon as the second active material in place of that used in Samples 18 to 25.

<Sample 26>

In sample 26, the anode was fabricated by using non-graphitizable carbon as the second active material, adjusting the content of the first active material to 33.3 wt % of the total anode active material, the density of the anode mixture layer to 1.75 g/cm³, and the packing ratio M to 0.5. Except for using such anode, the battery was fabricated similarly to as described in Sample 1.

<Sample 27>

In sample 27, the anode was fabricated by adjusting the density of the anode mixture layer to 2.3 g/cm³, and the packing ratio M to 0.66. Except for using such anode, the battery was fabricated similarly to as described in Sample 26.

<Sample 28>

In sample 28, the anode was fabricated by adjusting the density of the anode mixture layer to 2.8 g/cm³, and the packing ratio M to 0.8. Except for using such anode, the battery was fabricated similarly to as described in Sample 26.

<Sample 29>

In sample 29, the anode was fabricated by adjusting the density of the anode mixture layer to 1.7 g/cm³, and the packing ratio M to 0.48. Except for using such anode, the battery was fabricated similarly to as described in Sample 26.

<Sample 30>

In sample 30, the anode was fabricated by adjusting the density of the anode mixture layer to 2.9 g/cm³, and the packing ratio M to 0.83. Except for using such anode, the battery was fabricated similarly to as described in Sample 26.

Thus-fabricated batteries in Samples 26 to 30 were after the 100th cycle.

Table 4 shows evaluated results of the energy density and relative discharge capacity after the 100th cycle of Samples 26 to 30.

progress of the cycles, and the relative discharge capacity after the 100th cycle will thus become smaller.

It is also known from the evaluation results listed in Table 4 that Samples 26 to 28 having the packing ratio M on the anode side within a range from 0.5 to 0.8 showed larger values of the relative discharge capacity after the 100th cycle as compared with that of Sample 30 having a packing ratio M on the anode side of 0.83.

In Sample 30, similarly to the aforementioned Samples 11, 13 and 15, the packing ratio M on the anode side is as large as 0.83, the amount of packing of the anode active material in the anode mixture layer is too large, and thus the grains of the anode active material packed to form the anode mixture layer have a narrower gap between them. This promotes breakdown of the anode active material or separation of the anode mixture layer from the anode current collector, and the relative discharge capacity after the 100th cycle will become smaller.

On the other hand, Samples 26 to 28, again similarly to the aforementioned Samples 1 to 9, having the packing ratio M on the anode side within a range from 0.5 to 0.8, are successful in preventing degradation of the anode, and in achieving excellent charge/discharge characteristics.

As judged from the above, it is known that control of the packing ratio M on the anode side within a range from 0.5 to 0.8 makes it possible to fabricate a battery which is excellent both in the charge/discharge characteristics and energy density even when the second active material is altered from the scaly graphite to the non-graphitizable carbon.

TABLE 4

|  | 1st active material | | | 2nd active material | | | | | | | Relative |
| --- | --- | --- | --- | --- | --- | --- | --- | --- | --- | --- | --- |
|  | Material used | Butanol true specific gravity (g/cm³) | Weight (g) | Material used | Butanol true specific gravity (g/cm³) | Weight (g) | Content of 1st active material (wt %) | Density of anode mixture layer (g/cm³) | Packing ratio M | Energy density (Wh/L) | discharge capacity after the 100th cycle (%) |
| Sample 26 | 60 wt % Cu-40 wt % Sn | 7.5 | 30 | Hard carbon | 1.5 | 60 | 33.3 | 1.75 | 0.5 | 403 | 54 |
| Sample 27 |  |  |  |  |  |  |  | 2.3 | 0.66 | 448 | 69 |
| Sample 28 |  |  |  |  |  |  |  | 2.8 | 0.8 | 488 | 52 |
| Sample 29 |  |  |  |  |  |  |  | 1.7 | 0.48 | 397 | 47 |
| Sample 30 |  |  |  |  |  |  |  | 2.9 | 0.83 | 496 | 46 |

The energy density and relative discharge capacity after the 100th cycle of Samples 26 to 30 were measured similarly to as described for Samples 1 to 17.

It is known from the results summarized in Table 4 that Samples 26 to 28 having a packing ratio M on the anode side within a range from 0.5 to 0.8 show larger values of the energy density and relative discharge capacity after the 100th cycle as compared with that of Sample 29 having a packing ratio M on the anode side of 0.48.

Because in Sample 29, similarly to Samples 10, 12 and 14, the packing ratio M on the anode side is as small as 0.48, the amount of packing of the anode active layer in the anode mixture layer is too small, and thus the grains of the anode active material packed to form the anode mixture layer have a larger gap between them, the gap between the grains of the anode active material will gradually increase with the progress of the charge/discharge cycle, also reduction in the conductivity on the anode side will become larger with the

What is claimed is:

1. A non-aqueous electrolyte battery comprising:
   an cathode containing an cathode active material allowing lithium to insert/extract thereto and therefrom;
   an anode comprising an anode mixture layer having an anode active material which contains a first active material and/or a second active material,
      said first active material being capable of allowing lithium to insert/extract thereto and therefrom, and comprising a metal, an alloy or a compound reactive with lithium, and
      said second active material comprising a carbonaceous material allowing lithium to insert/extract thereto and therefrom; and
   a non-aqueous electrolyte containing an electrolytic salt,
   wherein said anode contains said first active material at least in an amount of 10 wt % of the total anode active material, and a packing ratio $y/((ax+bz)/(a+b))$ of said anode mixture layer falls within a range from 0.5 to 0.8, both ends inclusive, where "a" represents weight of said first active material, "x" represents true specific gravity of said first active material, "b" represents weight of said second active material, "z" represents true specific gravity of said second active material, and "y" represents density of said anode mixture layer.

2. The non-aqueous electrolyte battery as claimed in claim 1, wherein said cathode active material contains any one of, or any combination of elements selected from $TiS_2$, $MoS_2$, $NbSe_2$, $V_2O_5$, $LiCoO_2$, $LiNiO_2$, $Li_xNi_yCo_{1-y}O_2$ (where x and y satisfy $0<x<1$ and $0.7<y<1.02$, respectively) and $LiMn_2O_4$.

3. The non-aqueous electrolyte battery as claimed in claim 1, wherein said first active material of said anode contains any one of, or any combination of elements selected from As, Mg, B, Al, Ga, In, Si, Ge, Sn, Pb, Sb, Bi, Cd, Ag, Zn, Hf, Zr and Y; compounds including any of these elements; and Li—Al, Al—Sb and Cu—Mg—Sb.

4. The non-aqueous electrolyte battery as claimed in claim 1, wherein said first active material of said anode contains any one of, or any combination of elements selected from Sn, Si, Ge, Pb and In.

5. The non-aqueous electrolyte battery as claimed in claim 1, wherein said first active material of said anode contains any one of, or any combination of elements selected from 80 wt % Cu-20 wt % Si, 60 wt % Cu-40 wt % Sn, $SiB_4$, $SiB_6$, $Mg_2Si$, $Mg_2Sn$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$ and $ZnSi_2$.

6. The non-aqueous electrolyte battery as claimed in claim 1, wherein said first active material of said anode contains any one of, or any combination of elements selected from SiC, $Si_3N_4$, $Si_2N_2O$, $SiO_x$ ($0<x\leq2$), $SnO_x$ ($0<x\leq2$), LiSiO and LiSnO.

7. The non-aqueous electrolyte battery as claimed in claim 1, wherein said second active material of said anode contains any one of, or any combination of elements selected from artificial graphite, naturally-occurred graphite, scaly graphite, non-graphitizable carbon, thermally decomposed carbon, cokes, vitreous carbon fiber, organic polymer sintered material, carbon fiber, activated carbon and carbon black.

8. The non-aqueous electrolyte battery as claimed in claim 1, wherein said second active material of said anode is at least either one of carbon obtained by thermally decomposing organic compounds and non-graphitizable carbon.

9. The non-aqueous electrolyte battery as claimed in claim 1, wherein both of said cathode and said anode have a strip form, are layered while placing a strip-formed separator comprising a porous film in between, and are wound up so as to structure a wound body.

* * * * *